United States Patent
Chen et al.

(10) Patent No.: US 10,782,219 B2
(45) Date of Patent: Sep. 22, 2020

(54) PARTICLE COUNTING METHOD AND DEVICE

(71) Applicant: INDUSTRIAL TECHNOLOGY RESEARCH INSTITUTE, Hsinchu (TW)

(72) Inventors: Sheng-Jui Chen, Taoyuan (TW); Sheau-Shi Pan, Hsinchu (TW); Ta-Chang Yu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 264 days.

(21) Appl. No.: 15/853,475

(22) Filed: Dec. 22, 2017

(65) Prior Publication Data

US 2019/0195765 A1 Jun. 27, 2019

(51) Int. Cl.
*G01N 15/02* (2006.01)
*G01N 15/14* (2006.01)
(Continued)

(52) U.S. Cl.
CPC ....... *G01N 15/0205* (2013.01); *G01N 15/065* (2013.01); *G01N 15/1425* (2013.01);
(Continued)

(58) Field of Classification Search
CPC ............. G01N 15/0205; G01N 15/065; G01N 15/1425; G01N 15/1434; G01N 2015/0038; G01N 2015/0046; G01N 2015/1486
(Continued)

(56) References Cited

U.S. PATENT DOCUMENTS 6,606,157 B1 8/2003 Kaye et al.
6,639,671 B1 10/2003 Liu
(Continued)

FOREIGN PATENT DOCUMENTS

CN 1784270 A 6/2006
CN 103105350 * 5/2013 ......... G01N 15/1434
(Continued)

OTHER PUBLICATIONS

TW Office Action cited in application No. 107100122 dated Jul. 6, 2018.
(Continued)

*Primary Examiner* — Sunghee Y Gray
(74) *Attorney, Agent, or Firm* — Maschoff Brennan

(57) ABSTRACT

A particle counting method comprises obtaining first particle information related to the gas to be measured by a first particle counter with a first particle size detection range, obtaining second particle information related to the gas to be measured by a second particle counter with a second particle size detection range, and generating particle size distribution information according to the first and second particle information. The first particle information includes a plurality of particle size ranges and a plurality of particle quantities wherein each of the plurality of particle size ranges corresponds to a respective one of the plurality of particle quantities, the second particle information includes the quantity of particles of which the size values are in the second particle size range, and the lower limit of the second particle size range is lower than that of the first particle size range.

16 Claims, 6 Drawing Sheets

(51) Int. Cl.
*G01N 15/06* (2006.01)
*G01N 15/00* (2006.01)

(52) U.S. Cl.
CPC . *G01N 15/1434* (2013.01); *G01N 2015/0038* (2013.01); *G01N 2015/0046* (2013.01); *G01N 2015/1486* (2013.01)

(58) Field of Classification Search
USPC .......................................................... 356/335
See application file for complete search history.

(56) References Cited

U.S. PATENT DOCUMENTS

| | | | |
|---|---|---|---|
| 7,430,046 | B2 | 9/2008 | Jiang et al. |
| 7,799,373 | B2 | 9/2010 | Sachweh et al. |
| 8,582,100 | B1 | 11/2013 | Tucker et al. |
| 2015/0285728 | A1 | 10/2015 | Ozdemir et al. |
| 2015/0293009 | A1* | 10/2015 | Henning ............. G01N 15/1463 356/72 |
| 2016/0216193 | A1 | 7/2016 | Han |
| 2017/0268980 | A1 | 9/2017 | Clayton et al. |
| 2017/0276590 | A1 | 9/2017 | Zimmermann |
| 2018/0364266 | A1* | 12/2018 | Browne ............... G01N 15/065 |

FOREIGN PATENT DOCUMENTS

| | | |
|---|---|---|
| CN | 103105350 A | 5/2013 |
| CN | 104487818 A | 4/2015 |
| CN | 106662519 A | 5/2017 |
| CN | 106769721 A | 5/2017 |
| TW | 200825400 A | 6/2008 |
| TW | 201621295 A | 6/2016 |

OTHER PUBLICATIONS

Stopford, C., et al., "Real-time detection of airborne asbestos by light scattering from magnetically re-aligned fibers," Centre for Atmospheric and Instrumentation Research, University of Hertfordshire, Hatfield, Hertfordshire AL10 9AB, UK, vol. 21, Issue 9, pp. 11356-11367 (May 6, 2013).

* cited by examiner

PARTICLE COUNTING METHOD AND DEVICE

TECHNICAL FIELD

This disclosure relates to a particle counting method, and more particularly to a particle counting method for a gas.

BACKGROUND

In the modern semiconductor industry, semiconductor components are miniaturized to nano-scale, and chemical contaminants produced in their processes are more susceptible to damage to products, clean rooms, and equipment than previous generation process technologies are. When these chemical contaminants are partially coagulated or the reaction products produced by them are deposited on semiconductor products, bridging channels are easily formed to form short circuit or open circuit in the circuit, or affect the light transmission in the lithography process, which must cause poor exposure. Therefore, most of the semiconductor manufacturers are seeking devices capable of detecting and analyzing the size values of airborne particles in real time.

Devices currently used for particle detection include optical particle counter (OPC) and scanning mobility particle sizer (SMPS), wherein the particle size detection range of the optical particle counter is about micro-scale so it is difficult for the optical particle counter to detect nano-scale particles. The scanning mobility particle sizer is widely used in the market for detecting nano-scale particles; however, because it is a combination of a differential mobility analyzer (DMA) and a condensation particle counter (CPC) and the detection efficiency of the differential mobility analyzer is only 5%, it is hard to effectively detect the particles.

SUMMARY

Accordingly, this disclosure provides particle counting method and device.

According to an embodiment of this disclosure, a particle counting method comprises obtaining first particle information related to a gas to be analyzed by a first particle counter having a first particle size detection range, obtaining second particle information related to the gas to be analyzed by a second particle counter having a second particle size detection range, and generating particle size distribution information of the gas to be analyzed according to the first particle information and the second particle information. The first particle information comprises a plurality of particle size ranges in the first particle size detection range and a plurality of particle quantities, with each of the plurality of particle size ranges corresponding to a respective one of the plurality of particle quantities, the second particle information comprises a quantity sum of particles with size values being in the second particle size detection range, and the lower limit of the second particle size detection range is lower than that of the first particle size detection range.

According to an embodiment of this disclosure, a particle counting device comprises a first particle counter, second particle counter and a controller wherein the controller is electrically connected with the first particle counter and the second particle counter. The first particle counter has a first particle size detection range, and is configured to obtain first particle information related to a gas to be analyzed, with the first particle information comprising a plurality of particle size ranges in the first particle size detection range and a plurality of particle quantities, with each of the plurality of particle size ranges corresponding to a respective one of the plurality of particle quantities. The second particle counter has a second particle size detection range, and is configured to obtain second particle information related to the gas to be analyzed, with the second particle information comprising a quantity sum of particles with size values being in the second particle size detection range. The lower limit of the second particle size detection range is lower than the lower limit of the first particle size detection range. The controller is configured to generate particle size distribution information of the gas to be analyzed according to the first particle information and the second particle information.

In view of the above description, the particle counting method and device provided in this disclosure integrate two kinds of particle counters with different particle size detection ranges, particularly an optical particle counter and a condensation particle counter, in serial structure or parallel structure, so as to provide a particle counting device with simple structure, low cost, low hardware requirement, and capable of rapidly measuring the particle size range and the corresponding concentration of nano-sized particles.

The above description of the summary of this disclosure and the description of the following embodiments are provided to illustrate and explain the spirit and principles of this disclosure, and to provide further explanation of the scope of this disclosure.

DETAILED DESCRIPTION

The detailed features and advantages of the disclosure will be described in detail in the following description, which is intended to enable any person having ordinary skill in the art to understand the technical aspects of the present disclosure and to practice it. In accordance with the teachings, claims and the drawings of the disclosure, any person having ordinary skill in the art is able to readily understand the objectives and advantages of the disclosure. The following embodiments illustrate the disclosure in further detail, but the scope of the disclosure is not limited by any point of view.

Figure 1:
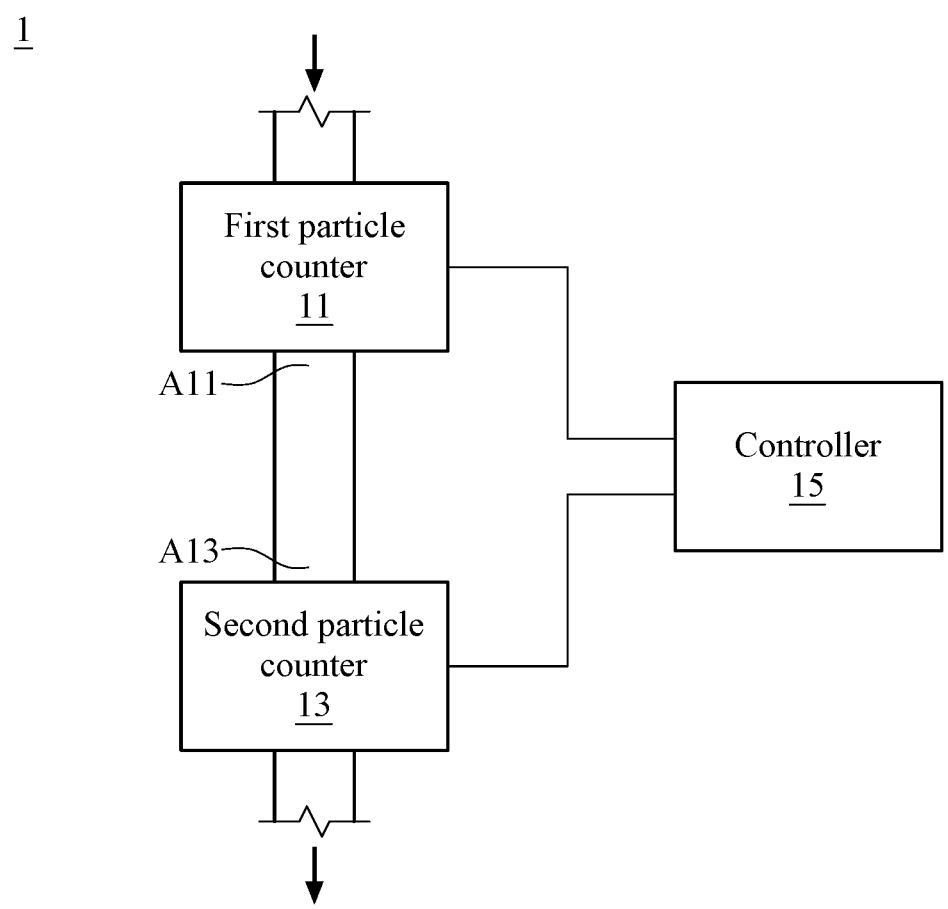
FIG. 1 is a function block diagram of a particle counting device according to an embodiment of this disclosure.

Please refer to FIG. 1 which is a function block diagram of a particle counting device according to an embodiment of this disclosure. As shown in FIG. 1, the particle counting device 1 comprises a first particle counter 11, a second particle counter 13 and a controller 15. The first particle counter 11 has a first particle size detection range, and is configured to obtain first particle information related to a gas to be analyzed. The first particle information comprises a plurality of particle size ranges in the first particle size detection range and a plurality of particle quantities, with each of the plurality of particle size ranges corresponding to a respective one of the plurality of particle quantities. More particularly, there is a one-to-one relationship between the particle size ranges and the particle quantities in the first particle information. The second particle counter 13 has a second particle size detection range, and is configured to obtain second particle information related to the gas to be analyzed. The second particle information comprises a quantity sum of particles with size values being in the second particle size detection range. The lower limit of the second particle size detection range of the second particle counter 13 is lower than that of the first particle size detection range of the first particle counter 11.

In this embodiment, the first particle counter 11 and the second particle counter 13 are connected in series. More particularly, the airflow output terminal A11 of the first particle counter 11 is connected with the airflow input terminal A13 of the second particle counter 13. When the particle counting of the gas to be analyzed is performed, an airflow of the gas to be analyzed is infused into the first particle counter 11, and the first particle counter 11 measures the airflow to obtain the first particle information related to the gas to be analyzed; then, the same airflow is transported to the second particle counter 13, and the second particle counter 13 measures this airflow to obtain the second particle information related to the gas to be analyzed. The detailed structure of the first particle counter 11 and the second particle counter 13 are described later.

The controller 15, a micro control unit (MCU) for example, is electrically connected with the first particle counter 11 and the second particle counter 13, and configured to obtain the first particle information and the second particle information from the first particle counter 11 and the second particle counter 13 so as to generate particle size distribution information of the gas to be analyzed. More particularly, the controller 15 defines that the first particle size detection range comprises at least a first particle size subrange, a second particle size subrange and a third particle size subrange according to various particle size values, with the first particle size subrange and the second particle size subrange being in the second particle size detection range, and the first particle size subrange and the second particle size subrange separated by a preset particle size value. In other words, the first particle size subrange as well as the second particle size subrange is the overlap between the first particle size detection range and the second particle size detection range, and the boundary value between the first particle size subrange and the second particle size subrange is the preset particle size value.

More particularly, the controller 15 defines the particle size subrange between the lower limit of the first particle size detection range and the preset particle size value as the first particle size subrange, defines the particle size subrange between the preset particle size value and the upper limit of the second particle size detection range as the second particle size subrange, and defines the particle size subrange between the upper limit of the second particle size detection range and the upper limit of the first particle size detection range as the third particle size subrange. In this embodiment, the quantity of particles with the size values lower than the preset particle size value in the particle size distribution information is generated by the controller 15 referring to the second particle information, wherein the referring method and the setting method for the preset particle size value are described later.

Figure 2:
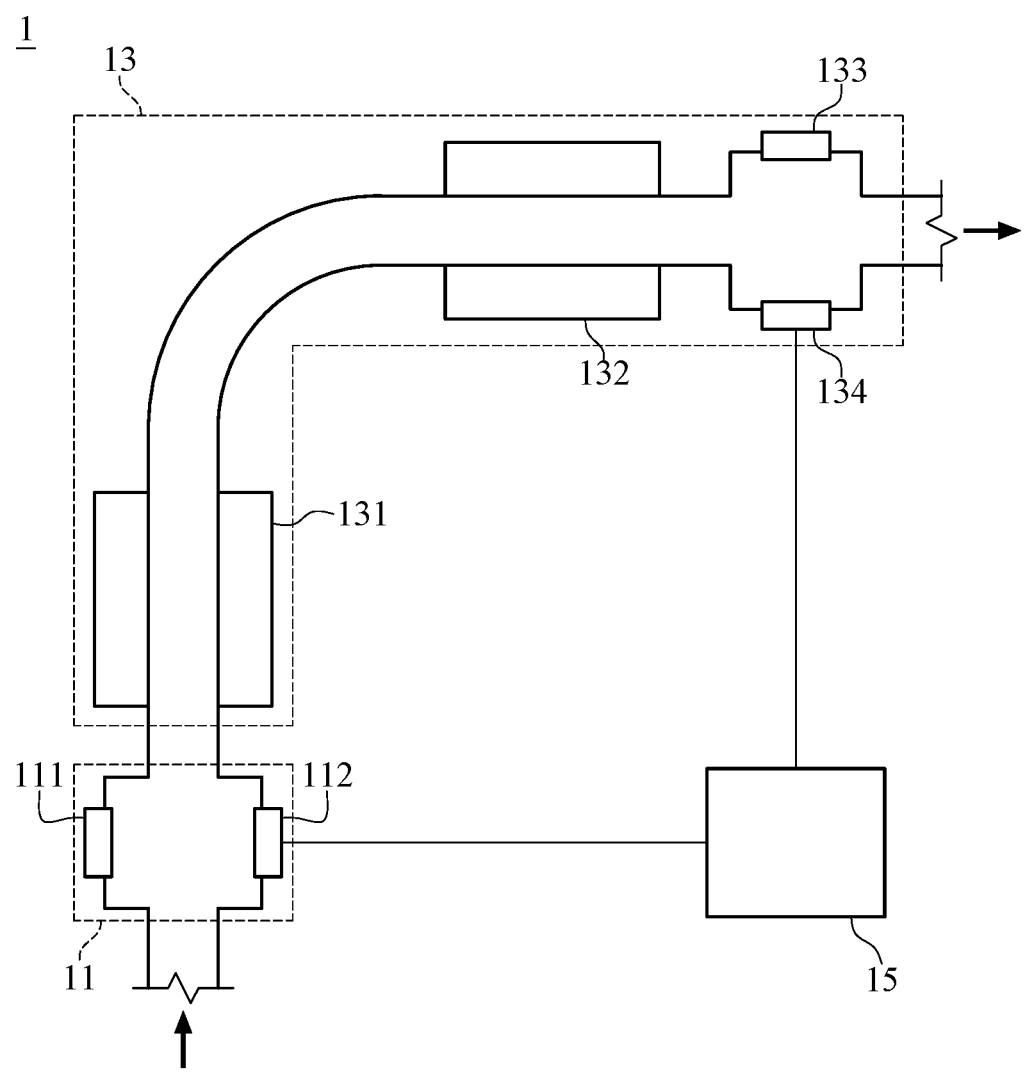
FIG. 2 is a detailed structure diagram of a particle counting device according to an embodiment of this disclosure.

Please refer to FIG. 1 and FIG. 2 for a particular explanation of the structure of the first and second particle counters 11 and 13 of the particle counting device 1, wherein FIG. 2 is a detailed structure diagram of a particle counting device 1 according to an embodiment of this disclosure. FIG. 2 exemplarily illustrates the detailed structure of the particle counting device 1 in FIG. 1. As shown in FIG. 2, the first particle counter 11 can be an optical particle counter (OPC) comprising a light emitter 111 and a light sensor 112. The light emitter 111 is configured to provide a light source such as white light or laser light. The detection limit of the optical particle counter (i.e. the lower limit of the first particle size detection range) using white light as the light source is between 0.3 micrometer (μm) and 0.5 μm; the detection limit of the optical particle counter using laser light as the light source is about 0.1 μm. The light sensor 112, such as a photo diode, is configured to detect the scattered light generated by the particles in the airflow when the light emitter 111 radiates the focused light to the airflow passing through the detection region, and to convert it into voltage pulses each of which indicates a particle, and the height corresponding to each of the voltage pulses (i.e. voltage value) can be functionally calculated to obtain the size value of the particle.

In this embodiment, the laser optical particle counter exemplifies the first particle counter 11. The first particle counter 11 has a first particle size detection range between about 0.1 μm and 10 μm, and can measure the airflow of the gas to be analyzed to obtain the voltage pluses corresponding to the particles in the airflow, and obtain the particle size ranges and the corresponding particle quantities, which are included in the first particle information as aforementioned, by conversion and statistics. In this embodiment, the first particle counter 11 can record the obtained first particle information in a tabular form in an in-built or an external memory.

As aforementioned, the first particle size detection range of the optical particle counter serving as the first particle counter 11 is between 0.1 μm and 10 μm. In other words, when the size value of a particle is lower than 0.1 μm, the first particle counter 11 is hard to detect this particle. Therefore, a condensation particle counter (CPC) which has the lower lower limit of the particle size detection range can serve as the second particle counter 13 serially connected with the first particle counter 11 so as to detect the particle with a size lower than 0.1 μm. For example, the condensation particle counter has a particle size detection range between 2.5 nanometer (nm) and 3 μm, and uses the mechanism of evaporation and condensation of an organic solvent to increase the size values of the tiny particles until these particles are detectable by an optical instrument. For example, the size values of these particle are increased to above 0.1 μm which is the detection limit of the aforementioned optical particle counter.

In the embodiment of FIG. 2, the condensation particle counter serving as the second particle counter 13 comprises a heating tube 131, a cooling tube 132, a light emitter 133 and a light sensor 134, wherein the structure of the light emitter 133 and the light sensor 134 are similar to the light emitter 111 and the light sensor 112 of the first particle counter 11. In other words, the second particle counter 13 comprises the optical particle counting structure, and the group of the heating tube 131 and the cooling tube 132 is configured to increase the size values of particles.

More particularly, the heating tube 131, the cooling tube 132 and the optical particle counting structure of the second particle counter 13 are sequentially connected in series. When an airflow is transported from the first particle counter 11 to the second particle counter 13, the airflow passes through the heating tube 131 full of saturated vapor wherein the saturated vapor can be formed from an organic solvent such as ethanol, n-butanol and so on, the particles of the airflow and the vapor are mixed and flow to the cooling tube 132 together, and then the vapor is cooled and condenses on the surfaces of the particles, so that the size values of the particles are increased to be detectable by the follow-up optical particle counting structure formed by the light emitter 133 and the light sensor 134. For example, the size values of the particles can be increased to be 10 μm by the operational mechanism of the condensation particle counter.

In another embodiment, the second particle counter 13 can also be designed in the form that the heating tube 131 is connected between the cooling tube 132 and the optical particle counting structure, and water is used to be the material for increasing the size values of particles. In other words, the airflow of the gas to be analyzed sequentially passes through the cooling tube 132, the heating tube 131 and the optical particle counting structure for being measured. More particularly, when the airflow passes through the cooling tube 132, the cooling tube 132 cools the particles in the airflow so that the particles have low temperature; then, the airflow enters the heating tube 131 and the heating tube 131 provides water vapor to its interior. Since the moving rate of the water vapor is higher than the rate of the heat transfer, the water vapor condenses on the surfaces of the particles before they are warmed up; therefore, the size values of the particles are increased. Afterwards, the airflow is measured by the optical particle counting structure formed by the light emitter 133 and the light sensor 134 for detecting the quantity of the particles therein. The second particle counter 13 which is implemented by the condensation particle counter changes the size values of the particles during the detection of the particles in the airflow, so the second particle information obtained by the second particle counter 13 in the above embodiment indicates the quantity sum of the particles with size values in the second particle size detection range (e.g. 2.5 nm to 3 μm).

Figure 3:
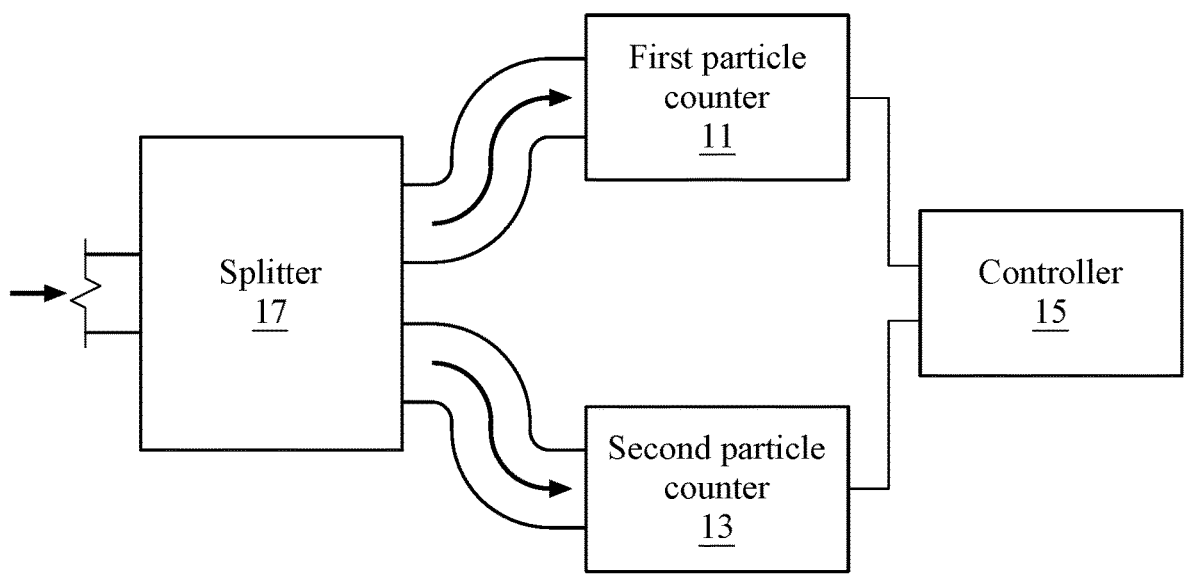
FIG. 3 is a function block diagram of a particle counting device according to another embodiment of this disclosure.

Please refer to FIG. 3, which is a function block diagram of a particle counting device according to another embodiment of this disclosure. Similar to the particle counting device 1 shown in FIG. 1, the particle counting device 1' shown in FIG. 3 comprises a first particle counter 11, a second particle counter 13 and a controller 15. The first particle counter 11 has a first particle size detection range, and is configured to obtain the first particle information related to a gas to be analyzed. The first particle information comprises a plurality of particle size ranges in the first particle size detection range and a plurality of particle quantities, with each of the plurality of particle size ranges corresponding to a respective one of the plurality of particle quantities. More particularly, there is a one-to-one relationship between the particle size ranges and the particle quantities in the first particle information. The second particle counter 13 has a second particle size detection range, with the lower limit of the second particle size detection range is lower than that of the first particle size detection range of the first particle counter 11.

The second particle counter 13 is configured to obtain the second particle information related to the gas to be analyzed. The second particle information comprises a quantity sum of particles with size values being in the second particle size detection range. In this embodiment, the first particle counter 11 and the second particle counter 13 have a parallel connection therebetween, and respectively measure two identical airflows generated from the same gas to be analyzed so as to obtain the first particle information and the second particle information. More particularly, the particle counting device 1' comprises a flow splitter 17 to split the gas to be analyzed into two identical airflows, and respectively supply them to the first particle counter 11 and the second particle counter 13, wherein the two identical airflows have the same particle size distribution.

The controller 15 of the particle counting device 1', similar to the controller 15 of the particle counting device 1 in FIG. 1, is electrically connected with the first particle counter 11 and the second particle counter 13, and configured to generate the particle size distribution information of the gas to be analyzed according to the first particle information and the second particle information which are respectively obtained from the first particle counter 11 and the second particle counter 13. More particularly, the controller 15 can define that the first particle size detection range comprises at least a first particle size subrange, a second particle size subrange and a third particle size subrange according to various particle size values, with the first particle size subrange and the second particle size subrange being in the second particle size detection range, and the first particle size subrange and the second particle size subrange separated by a preset particle size value. In other words, the first particle size subrange as well as the second particle size subrange is the overlap between the first particle size detection range and the second particle size detection range, and the boundary value between the first particle size subrange and the second particle size subrange is the preset particle size value.

More particularly, the controller 15 defines the particle size subrange between the lower limit of the first particle size detection range and the preset particle size value as the first particle size subrange, defines the particle size subrange between the preset particle size value and the upper limit of the second particle size detection range as the second particle size subrange, and defines the particle size subrange between the upper limit of the second particle size detection range and the upper limit of the first particle size detection range as the third particle size subrange. In this embodiment, the quantity of particles with the size values lower than the preset particle size value in the particle size distribution information is generated by the controller 15 referring to the second particle information, wherein the referring method and the setting method for the preset particle size value are described later.

Figure 4:
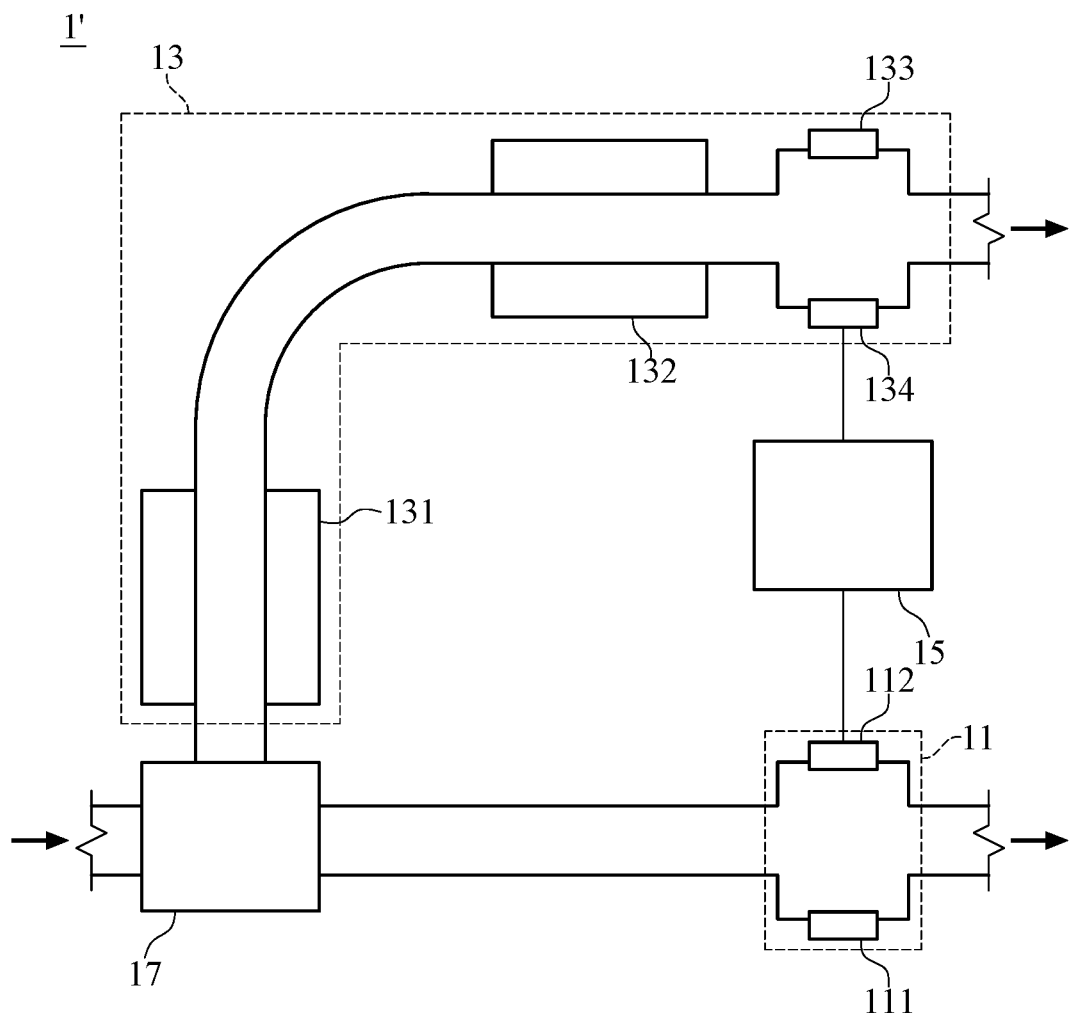
FIG. 4 is a detailed structure diagram of a particle counting device according to another embodiment of this disclosure.

Please refer to FIG. 3 and FIG. 4 for a particular explanation of the structure of the first and second particle counters 11 and 13 of the particle counting device 1', wherein FIG. 4 is a detailed structure diagram of a particle counting device according to another embodiment of this disclosure. FIG. 4 exemplarily illustrates the detailed structure of the particle counting device '1 in FIG. 3. As shown in FIG. 4, the first particle counter 11 of the particle counting device 1' can be implemented by an optical particle counter, and the second particle counter 13 can be implemented by a condensation particle counter. In this embodiment, the gas to be analyzed is split into two identical airflows by the flow splitter 17, and the airflows are respectively infused into the first particle counter 11 and the second particle counter 13.

Similar to the aforementioned embodiment of FIG. 2, the first particle counter 11 of the particle counting device 1' comprises a light emitter 111 and a light sensor 112, and has the first particle size detection range between 0.1 μm and 10 μm for example. When the airflow flows through the first particle counter 11, the particles in the airflow make the light from the light emitter 111 scatters. The light sensor 112 detects the scattered light and converts it into voltage pulses so as to obtain the relations respectively between the particle size ranges in the first particle size detection range and the particle quantities and record these relations as the first particle information. The second particle counter 13 of the particle counting device 1', also similar to that in the aforementioned embodiment of FIG. 2, can be implemented by a condensation particle counter. The size values of the particles are increased through the mechanism of organic solvent evaporation and condensation or the mechanism of particle cooling and water vapor condensation, and then the particles are detected by the optical particle counting structure so that the quantity sum of the particles with the size values being in the second particle size detection range is obtained and recorded as the second particle information. The detection process of the particles in the gas performed by the first and second particle counters 11 and 13 of the particle counting device 1' are similar to those as described in the previous embodiment of FIG. 2, so the related details are not repeated.

Moreover, in the above embodiments, the particle counting device 1 or 1' can further comprise a display which is electrically connected with the controller 15 and configured to display the particle size distribution information generated by the controller 15. In addition, the particle counting device 1 or 1' can comprise a wireless signal transceiver which is electrically connected with the controller and configured to transmit the particle size distribution information to a personal device of a user or other platform.

In the above embodiments, the first particle counter 11 and the second particle counter 13 can respectively execute calibration procedure to normalize the detection efficiency of the subsequent particle counting of the gas to be analyzed before performing the particle counting of the gas to be analyzed. More particularly, in the example wherein the optical particle counter serving as the first particle counter 11, in the normalization process, the sample gas is classified into various types of single-distributed airflows with different particle sizes by a differential mobility analyzer (DMA); then, each of these single-distributed airflows are measured by a standard particle counter and the optical particle counter simultaneously, and the voltage pulse height analysis and particle counting are performed during the measurement. The detection efficiency curve can be obtained based on the ratio between the counting value of the optical particle counter and that of the standard particle counter. Afterwards, the plateau region (i.e. the region with the maximum constant value) of the detection efficiency of the optical particle counter is compensated to 100% by a detection efficiency compensation curve, and a particle size versus pulse height curve of the optical particle counter is obtained by performing the electrical mobility equivalent particle diameter analysis by the differential mobility analyzer and performing the pulse height analysis by the optical particle counter. For the condensation particle counter, its normalization method is approximately similar to that of the optical particle counter, and the difference therebetween is that the condensation particle counter can merely perform the counting of voltage pulses except the height analysis of voltage pulses, but this disclosure is not limited to this.

Figure 5:
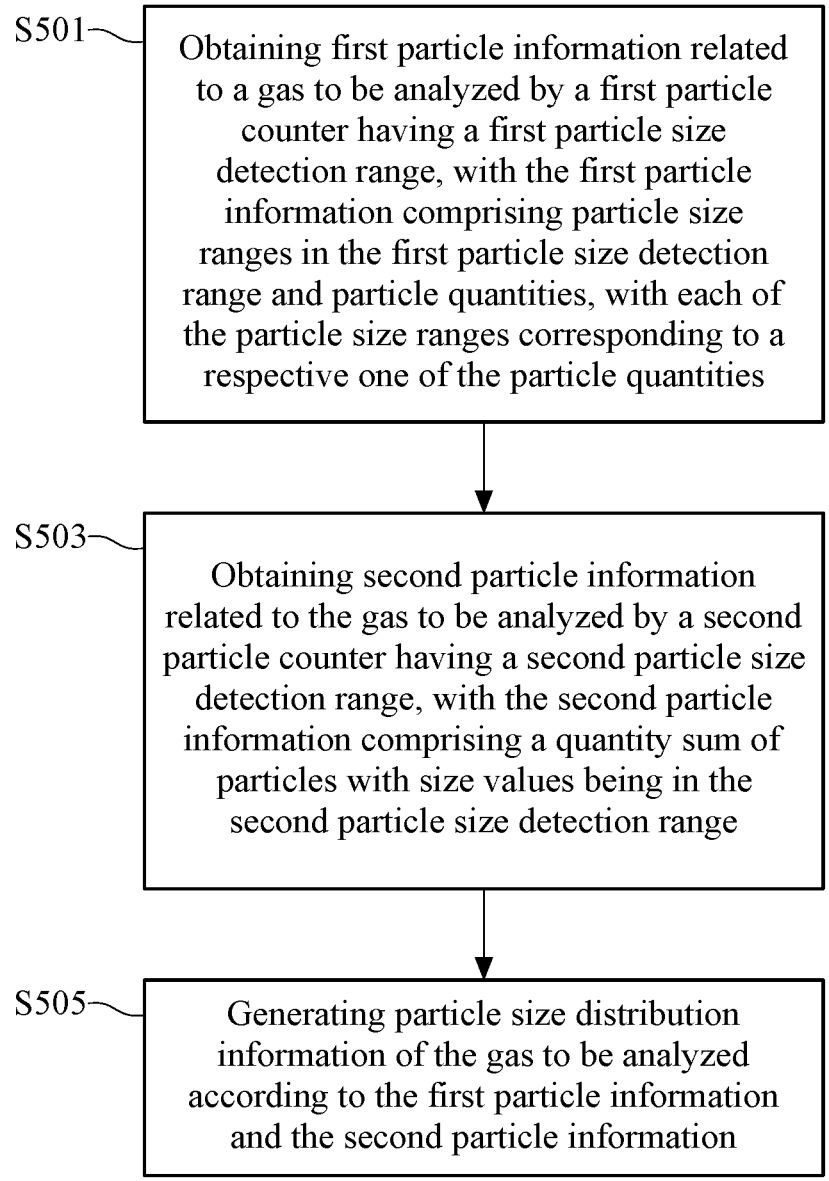
FIG. 5 is a flow chart of a particle counting method according to an embodiment of this disclosure.
Figure 6:
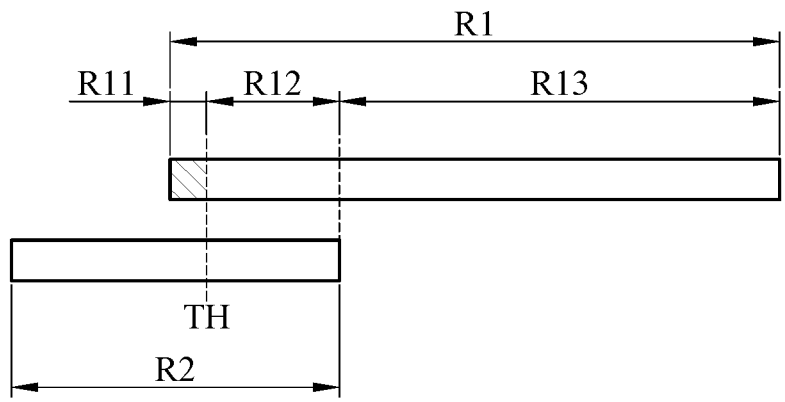
FIG. 6 is a schematic diagram of a particle size detection range of a particle counting device according to an embodiment of this disclosure.
Figure 7:
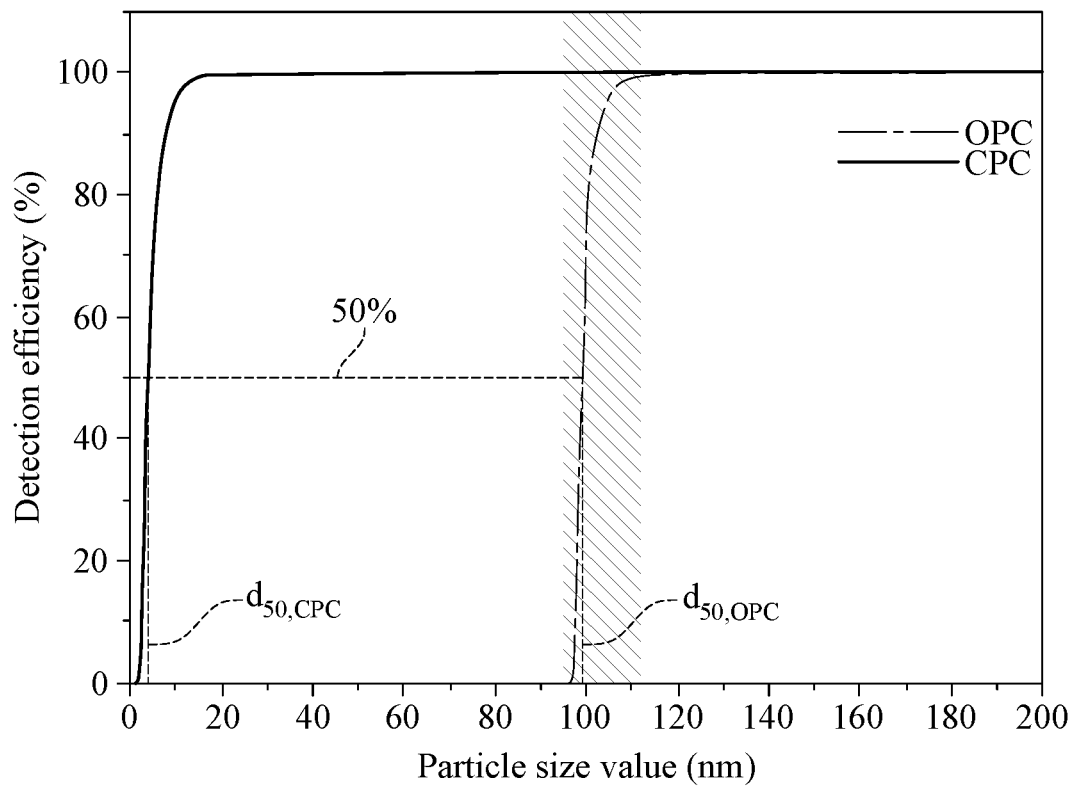
FIG. 7 is a detection efficiency curve diagram of a particle counting device according to an embodiment of this disclosure.

For the explanation of a particle counting method in an embodiment of this disclosure, please refer to FIGS. 1-7, wherein FIG. 5 is a flow chart of a particle counting method according to an embodiment of this disclosure; FIG. 6 is a schematic diagram of a particle size detection range of a particle counting device according to an embodiment of this disclosure; and FIG. 7 is a detection efficiency curve diagram of a particle counting device according to an embodiment of this disclosure. The particle counting method disclosed in FIG. 5 and FIG. 6 can be applied to either the particle counting device 1 with the serial structure as shown in FIG. 1 and FIG. 2 or the particle counting device 1' with the parallel structure as shown in FIG. 3 and FIG. 4. In the following, the particle counting method is exemplified to be performed by the particle counting device 1 in FIG. 1.

In step S501 shown in FIG. 5, the particle counting device 1 obtains first particle information related to the gas to be analyzed by the first particle counter 11 having a first particle size detection range, with the first particle information comprising a plurality of particle size ranges in the first particle size detection range and a plurality of particle quantities, with each of the plurality of particle size ranges corresponding to a respective one of the plurality of particle quantities. For example, the first particle counter 11 can be an optical particle counter as aforementioned, and its first particle size detection range is between 0.1 μm and 10 μm. The first particle information obtained by the first particle counter 11 comprises the particle size ranges between 0.1 μm and 0.5 μm, between 0.5 μm and 1 μm, between 1 μm and 3 μm and above 3 μm, and also comprises the particle quantities corresponding to these particle size ranges, namely the quantities of particles with the size values in respective ones of the particle size ranges. The particle size ranges can be designed according to the resolution of the particle counters and actual requirements, and are not limited in this disclosure. For example, the particle size ranges are spaced with 0.1 μm.

In step S503, the particle counting device 1 obtains second particle information related to the gas to be analyzed by the second particle counter 13 having a second particle size detection range, with the second particle information comprising a quantity sum of particles with size values being in the second particle size detection range. The lower limit of the second particle size detection range is lower than the lower limit of the first particle size detection range. In other words, compared with the first particle counter 11, the second particle counter 13 can obtain the quantity of the smaller particles in the gas. For example, the second particle counter 13 can be a condensation particle counter, and its second particle size detection range is between 5 nm and 3 μm, so the second particle information obtained by the second particle counter 13 indicates the quantity of the particles with size value being in this particle size detection range, in the airflow of the gas to be analyzed.

In step S505, the controller 15 of the particle counting device 1 obtains the first and second particle information from the first and second particle counters 11 and 13 so as to generate the particle size distribution information of the gas to be analyzed. As shown in FIG. 6, there is an overlap between the first particle size detection range R1 of the first particle counter 11 and the second particle size detection range R2 of the second particle counter 13, and the lower limit of the first particle size detection range R1 is higher than the lower limit of the second particle size detection range R2. More particularly, as aforementioned, the first particle counter 11 can obtain the relations respectively between the particle size ranges in the first particle size detection range and the particle quantities. Therefore, the first particle size detection range can be defined to comprise at least a first particle size subrange, a second particle size subrange and a third particle size subrange according to various particle size values, wherein the first particle size subrange R11 and the second particle size subrange R12 are in the second particle size detection range R2. In other words, the first particle size subrange R11 and the second particle size subrange R12 can be considered as the overlap between the first particle size detection range R1 and the second particle size detection range R2, and the first particle size subrange R11 and the second particle size subrange R12 can be divided by a preset particle size value TH. More particularly, the first particle size subrange R11 indicates the particle size subrange between the lower limit of the first particle size detection range R1 and the preset particle size value TH; the second particle size subrange R12 indicates the particle size subrange between the preset particle size value TH and the upper limit of the second particle size detection range R2; and the third particle size subrange R13 indicates the particle size subrange between the upper limit of the second particle size detection range R2 and the upper limit of the first particle size detection range R1.

In an embodiment, the preset particle size value TH can be set according to the detection efficiency curve diagram of the first and second particle counters 11 and 13 as shown in FIG. 7. In general, the lower limit of the particle size detection of a particle counter is usually defined as the particle size value corresponding to the 50% detection efficiency. In FIG. 7, an optical particle counter serves as the first particle counter 11 and a condensation particle counter serves as the second particle counter 13 as an example, and the lower limit $d_{50,OPC}$ of the particle size detection of the first particle counter 11 is about 100 nm (0.1 µm). Ideally, the detection efficiency curves of the particle counters are in the step form; that is, all the particle size values higher than the lower limit of the particle size detection correspond to 100% detection efficiency. However, in practice, the efficiency curve corresponding to the particle size values about the lower limit of the particle size detection (i.e. the shaded region in FIG. 7) varies with changes in airflow rate, cavity temperature, pressure, etc. Therefore, the detection efficiency corresponding to the particle size range in the shaded region is unknown and easily variable to cause detection error.

In order to avoid said detection error, in this embodiment, the preset particle size value TH can be set higher than the particle size values in the shaded region, such as 120 nm, 150 nm, etc. In another embodiment, the preset particle size value TH can also be set as the lower limit of the particle size detection of the first particle counter 11, such as 100 nm. For the particles with the size values higher than the preset particle size value TH, the controller 15 refers to the first particle information obtained by the first particle counter 11 to generate the corresponding particle size distribution information; for the particles with the size values lower than the preset particle size value TH, the controller 15 refers to the second particle information to generate the corresponding particle size distribution information. Therefore, it is ensured that all the particle size distribution information is generated from the information which is obtained by the particle counters when they have the best detection efficiency.

More particularly, the particle size distribution information corresponding to the particles with the size values lower than the preset particle size value TH can be obtained by the following method. The controller 15 subtracts the sum of the particle quantities corresponding to the particle ranges included in the second particle size subrange R12 from the particle quantity sum corresponding to the second particle size detection range R2 in FIG. 6 to obtain the difference value therebetween and record it as the particle quantity corresponding to the size values lower than the preset particle size value TH in the particle size distribution information, so as to exclude the information corresponding to the first particle size subrange R11 (i.e. the information obtained by the variable detection efficiency in the shaded region in FIG. 7), thus further enhance the accuracy of the particle size distribution information. The particle size distribution information corresponding to the particles with size values higher than the preset particle size value TH (i.e. the particle size distribution information corresponding to the second particle size subrange R12 plus the third particle size subrange R13 in FIG. 6) refers to the particle ranges and particle quantities originally comprised in the first particle information. The controller 15 can calculate the sum value of the particle quantity corresponding to the size values lower than the preset particle size value TH and the particle quantity corresponding to the size values higher than the preset particle size value TH (i.e. the quantity sum of particles with size values in the particle size range including the second particle size subrange R12 and the third particle size subrange R13), so as to obtain the total particle concentration of the gas to be analyzed according to the sum value and the volume of the gas to be analyzed.

In this embodiment, the optical particle counter and the condensation particle counter are integrated, and the range between the lower limit of the particle size detection of the condensation particle counter and the preset particle size value is set as one of the plurality of particle size ranges included in the particle size distribution information, so that the conventional problem that it is difficult to detect nanoscale particles by only using the optical particle counter may be solved, and the detection accuracy for the particles with size values around the lower limit of the particle size detection of the optical particle counter may be enhanced. Moreover, the condensation particle integrated with the optical particle counter has no need to be combined with the differential mobility analyzer for performing the detection, so that the detection efficiency of the particle counting device may be greatly enhanced.

In another embodiment, before dividing the particle size range into the first particle size subrange R11 and the second particle size subrange R12 by the preset particle size value TH, the controller 15 subtracts the particle quantities, corresponding to the overlap between the first particle size detection range R1 and the second particle size detection range R2, in the first particle information from the quantity sum of particles with size values being in the second particle size detection range R2, and then adds the particle quantity, corresponding to the shaded region defined by the preset particle size value TH, in the first particle information (i.e. the quantity of particles with size values being in the first particle size subrange R11), so as to obtain the calculation result similar to that in the above embodiment and record it as the quantity of particles with size values lower than the preset particle size value TH in the gas to be analyzed. Moreover, the controller 15 can add the quantity sum of particles with size values being in the second particle size detection range R2 to the sum of the particle quantities, corresponding to the particle size ranges being in the third particle size subrange R13, in the first particle information, and obtain the total particle concentration of the gas to be analyzed according to the calculation result and the volume of the gas to be analyzed. In addition, a particle size distribution curve of the gas to be analyzed can be generated according to the total particle concentration and the aforementioned particle size distribution information.

In view of the above description, the particle counting method and device provided in this disclosure integrate two kinds of particle counters with different particle size detection ranges, particularly an optical particle counter and a condensation particle counter, in serial structure or parallel structure, so as to provide particle counting method and device with simple structure, low cost, low hardware requirement, and capable of rapidly measuring the particle size range and the corresponding concentration of nano-sized particles.

Although the aforementioned embodiments of this disclosure have been described above, this disclosure is not limited thereto. The amendment and the retouch, which do not depart from the spirit and scope of this disclosure, should fall within the scope of protection of this disclosure. For the scope of protection defined by this disclosure, please refer to the attached claims.

| [SYMBOLIC EXPLANATION] | |
|---|---|
| 1, 1' | particle counting device |
| 11 | first particle counter |
| 13 | second particle counter |
| 15 | controller |
| A11 | airflow output terminal |
| A13 | airflow input terminal |
| 111, 133 | light emitter |
| 112, 134 | light sensor |
| 131 | heating tube |
| 132 | condensing tube |
| 17 | flow splitter |
| S501~S505 | steps |
| R1 | first particle size detection range |
| R11 | first particle size subrange |
| R12 | second particle size subrange |
| R13 | third particle size subrange |
| R2 | second particle size detection range |
| TH | preset particle size value |
| OPC | optical particle counter |
| CPC | condensation particle counter |
| $d_{50,\ OPC}$, $d_{50,\ CPC}$ | lower limit of particle size detection |

What is claimed is:

1. A particle counting method, comprising:
   obtaining first particle information related to a gas to be analyzed by a first particle counter having a first particle size detection range, with the first particle information comprising a plurality of particle size ranges in the first particle size detection range and a plurality of particle quantities, with each of the plurality of particle size ranges corresponding to a respective one of the plurality of particle quantities;
   obtaining second particle information related to the gas to be analyzed by a second particle counter having a second particle size detection range, with the second particle information comprising a quantity sum of particles with size values being in the second particle size detection range;
   generating particle size distribution information of the gas to be analyzed according to the first particle information and the second particle information; and
   by a micro control unit, defining a first particle size subrange between a lower limit of the first particle size detection range and a preset particle size value, defining a second particle size subrange between the preset particle size value and an upper limit of the second particle size detection range, and defining a third particle size subrange between the upper limit of the second particle size detection range and an upper limit of the first particle size detection for calculating a quantity of particles with size values lower than the preset particle size value in the particle size distribution information;
   wherein a lower limit of the second particle size detection range is lower than the lower limit of the first particle size detection range;
   wherein the first particle counter is an optical particle counter and the first and second particle detection ranges different from each other.

2. The particle counting method according to claim 1, wherein a quantity of particles with size values lower than the preset particle size value in the particle size distribution information refers to the second particle information.

3. The particle counting method according to claim 1, wherein the step of generating the particle size distribution information of the gas to be analyzed according to the first particle information and the second particle information comprises calculating a difference value between the quantity sum of particles with the size values in the second particle size detection range and a sum of a part of the plurality of particle quantities in the first particle information, and recording the difference value as a quantity of particles with size values lower than the preset particle size value in the particle size distribution information, with the part of the plurality of particle quantities corresponding to a part of the plurality of particle size ranges in the second particle size subrange.

4. The particle counting method according to claim 3, further comprises adding the quantity of particles with the size values lower than the preset particle size value to a sum of another part of the plurality of particle quantities in the first particle information so as to obtain a total particle concentration of the gas to be analyzed, with the part of the plurality of particle quantities corresponding to another part of the plurality of particle size ranges in the second particle size subrange and the third particle size subrange.

5. The particle counting method according to claim 1, further comprises adding the quantity sum of particles with the size values being in the second particle size detection range to a sum of a part of the plurality of particle quantities so as to obtain a total particle concentration of the gas to be analyzed, with the part of the plurality of particle quantities corresponding to a part of the plurality of particle size ranges in the third particle size subrange.

6. The particle counting method according to claim 1, further comprises sequentially supplying the gas to be analyzed to the first particle counter and the second particle counter so as to sequentially obtaining the first particle information and the second particle information.

7. The particle counting method according to claim 1, further comprises splitting the gas to be analyzed into two identical airflows, and respectively supplying the two identical airflows to the first particle counter and the second particle counter so as to respectively obtain the first particle information and the second particle information.

8. The particle counting method according to claim 1, wherein the first particle counter belongs to an optical particle counter and the second particle counter belongs to a condensation particle counter.

9. A particle counting device, comprising:
   a first particle counter, having a first particle size detection range, and configured to obtain first particle information related to a gas to be analyzed, with the first particle information comprising a plurality of particle size ranges in the first particle size detection range and a plurality of particle quantities, with each of the plurality of particle size ranges corresponding to a respective one of the plurality of particle quantities;

a second particle counter, having a second particle size detection range, and configured to obtain second particle information related to the gas to be analyzed, with the second particle information comprising a quantity sum of particles with size values being in the second particle size detection range; and a micro control unit, electrically connected with the first particle counter and the second particle counter, and configured to generate particle size distribution information of the gas to be analyzed according to the first particle information and the second particle information, and to define a first particle size subrange between a lower limit of the first particle size detection range and a preset particle size value, defining a second particle size subrange between the preset particle size value and an upper limit of the second particle size detection range, and defining a third particle size subrange between the upper limit of the second particle size detection range and an upper limit of the first particle size detection for calculating a quantity of particles with size values lower than the preset particle size value in the particle size distribution information;

wherein a lower limit of the second particle size detection range is lower than the lower limit of the first particle size detection range;

wherein the first particle counter is an optical particle counter and the first and second particle detection ranges different from each other.

10. The particle counting device according to claim 9, wherein a quantity of particles with size values lower than the preset particle size value in the particle size distribution information refers to the second particle information.

11. The particle counting device according to claim 9, wherein when generating the particle size distribution information of the gas to be analyzed, the micro control unit calculates a difference value between the quantity sum of particles with the size values being in the second particle size detection range and a sum of a part of the plurality of particle quantities in the first particle information, and records the difference value as a quantity of particles with size values lower than the preset particle size value in the particle size distribution information, with the part of the plurality of particle quantities corresponding to a part of the plurality of particle size ranges in the second particle size subrange.

12. The particle counting device according to claim 11, wherein the micro control unit further adds the quantity of particles with the size values lower than the preset particle size value to a sum of another part of the plurality of particle quantities in the first particle information so as to obtain a total particle concentration of the gas to be analyzed, with the part of the plurality of particle quantities corresponding to another part of the plurality of particle size ranges in the second particle size subrange and the third particle size subrange.

13. The particle counting device according to claim 9, wherein the micro control unit further adds the quantity sum of particles with the size values being in the second particle size detection range to a sum of a part of the plurality of particle quantities so as to obtain a total particle concentration of the gas to be analyzed, with the part of the plurality of particle quantities corresponding to a part of the plurality of particle size ranges in the third particle size subrange.

14. The particle counting device according to claim 9, wherein an airflow output terminal of the first particle counter is connected with an airflow input terminal of the second particle counter, the first particle counter is configured to measure an airflow of the gas to be analyzed to obtain the first particle information, and to transport the airflow to the second particle counter, and the second particle counter is configured to measure the airflow to obtain the second particle information.

15. The particle counting device according to claim 9, further comprising a flow splitter connected with the first particle counter as well as the second particle counter and configured to split the gas to be analyzed into two identical airflows, and to respectively supply the two identical airflows to the first particle counter and the second particle counter, wherein the first particle counter and the second particle counter respectively measure the airflows so as to obtain the first particle information and the second particle information.

16. The particle counting device according to claim 9, wherein the first particle counter belongs to an optical particle counter and the second particle counter belongs to a condensation particle counter.

* * * * *